United States Patent Office 3,219,616
Patented Nov. 23, 1965

3,219,616
CYANOETHYL ESTER PLASTICIZERS FOR ACRYLONITRILE
Robert Saxon, Stamford, Conn., assignor to American Cyanamid Company, Stamford, Conn., a corporation of Maine
No Drawing. Application Oct. 25, 1960, Ser. No. 64,693, which is a continuation of application Ser. No. 752,188, July 31, 1958. Divided and this application June 21, 1963, Ser. No. 289,753
8 Claims. (Cl. 260—30.6)

This application is a divisional application of my earlier application having the Serial No. 64,693 filed October 25, 1960, now abandoned, which in turn was a continuation of my earlier application having the Serial No. 752,188 filed July 31, 1958, now abandoned.

The present invention relates to improved copolymeric compositions containing an average of at least 60% by weight of combined acrylonitrile. More specifically, the present invention relates to the plasticized polymers containing at least 60% acrylonitrile in order to provide a composition of improved moldability and flexural properties for the production of useful articles of manufacture.

The desirable properties of acrylonitrile in polymeric compositions is well known. However, polymers containing predominant amounts of combined acrylonitrile have not been suitable for various applications, such as in the manufacture of molded articles and as film-forming compositions due to the poor flowing properties of this polymer and because of the brittle character of the finished product. Plasticizers heretofore incorporated with polymers, containing a predominance of combined acrylonitrile, in order to improve the flexural properties of these polymers have not been generally satisfactory largely because of the significant incompatibility of the plasticizing compound with the polymer, resulting in a gradual migration of the plasticizer to the surface with consequent brittleness. Frequently, the result when incorporating compounds as plasticizer has been severe discoloration. Also, many compounds attempted for this use have proved unsatisfactory because the plastizer is water soluble and is consequently leached from the polymeric article upon contact with water, again resulting in bittleness. The present invention avoids such shortcomings and provides an improved plasticized polyacrylonitrile composition having excellent flexural properties and in which the plasticizer is water insoluble and fully compatible with the polymer.

It is an object of the present invention to provide a polymeric composition containing a preponderance of combined acrylonitrile of improved moldability and flexibility by incorporating into the polymer certain cyanoethyl esters as plasticizers. Other objects and advantages will become apparent hereinafter as the description of the invention proceeds.

The present invention is based upon the discovery that homopolymers and copolymers of acrylonitrile, specifically copolymers containing in their molecules an average of at least 60% by weight of combined acrylonitrile are compatible with certain cyanoethyl esters. Esters of this type which have been found useful are those of the condensation reaction of cyanoethanol and an acid selected from the group consisting of phosphoric acid, carbonic acid and dicarboxylic acids having the formula:

HOOC—R—COOH wherein R is a substituent selected from the group consisting of a phenylene radical and $C_nH_{2n}$ radicals in which $n$ is an integer of 0 to 8. The esters contemplated as useful in the practice of the invention are those which are fully esterified. By "fully esterified" it is intended that there be no free carboxyl groups together with the ester groups in the esters, i.e., when the acid is phosphoric the ester shall contain three cyanoethyl groups per molecule and when dibasic acids are employed in the preparation of the ester, the ester shall contain two cyanoethyl groups. These compounds as employed in my invention are contemplated as permanent plasticizers which are permitted to remain in the shaped homopolymer or copolymer to provide continuing flexibility to the product.

The cyanoethyl esters employed in the present invention are believed to be new chemical compounds, suitable illustrative procedures for their preparation being described below. However, except as to their use with acrylonitrile polymers, these compounds as such and their means of preparation form no part of the present invention.

PREPARATION OF TRIS(1-CYANOETHYL) PHOSPHATE

Into a suitable reaction vessel equipped with agitator, thermometer, inlet and outlet valves and heating and cooling means is introduced 79 parts of benzene and 89 parts of pyridine. The mixture is cooled to 10° C. and 71 parts (1 mole) of lactonitrile, i.e., a cyanoethanol having the formula $CH_3CHOHCN$, is added. The mixture is further cooled to between 0° C. and 10° C. while 50.7 parts (approximately 0.33 mole) of phosphorous oxychloride is slowly added. The mixture is then allowed to come to room temperature and stirred with 200 parts of ice water. The benzene layer is removed, washed twice with 50-part portions of water, dried over anhydrous sodium sulfate, and distilled. After the lower boiling material is removed, vacuum is applied and 40.8 parts of a colorless oil is collected at a pressure of 6 mm. and at a temperature of 201–207°. This oil has an index of refraction $n_D^{20.1} = 1.439$ and an analysis agreeing with that for the formula $C_9H_{12}N_3O_4P$.

Calculated: carbon, 42.0%; hydrogen, 4.7%; nitrogen, 16.3%; phosphorus, 12.0%. Found: carbon, 42.0%; hydrogen, 4.99%; nitrogen, 16.3%; phosphorus, 12.1%.

PREPARATION OF BIS(1-CYANOETHYL) ADIPATE

A flask containing 54.6 parts of lactonitrile and 66.5 parts of pyridine is fitted with an agitator, inlet and outlet valves, thermometer, and heating and cooling means. To the stirred mixture, 64.0 parts of adipyl chloride is added through the funnel during a one-hour period. The temperature in the flask rises slowly from 5° C. to 28° C. during this time. The desired product is recovered from the reaction mixture by addition of water to dissolve the pyridinum chloride formed as by-product; extracting the aqueous layer with ether; combining the organic layer with the ether extract; washing the combined organic solution with aqueous sodium carbonate and with water; and finally subjecting the washed organic solution to a distillation. After the readily volatile solvent is distilled, the bis(1-cyanoethyl)adipate product is collected (boils at 147–160°) at 0.17–0.23 mm. A yield of 68.4 parts (77.4%) is obtained.

Calculated: Percent nitrogen = 11.11%. Found by analysis: 10.81%.

The product is a colorless viscous oil solidifying at about room temperature.

PREPARATION OF BIS(2-CYANOETHYL) SUCCINATE

A mixture of 71 parts (1 mole) of ethylene cyanohydrin, 59 parts (½ mole) of succinic acid, 1 part of concentrated sulfuric acid, and 125 moles of benzene is heated, and a two-phase distillate is collected comprising essentially benzene plus water of reaction. A total of 19 parts of water, the theoretical amount for complete esterification, is collected. The liquid remaining in the reaction flask is extracted several times with aqueous sodium bicarbonate, then with water. Because of emulsification, some of the product is lost into the aqueous washes. The remaining organic layer is distilled. The desired bis(2-cyanoethyl) succinate is collected at 182–193° at 0.17–0.23 mm. pressure. 57 parts (26% of theoretical) of a viscous faintly yellowish oil is obtained.

Theoretical percent nitrogen=12.49%. Found: 12.04% nitrogen.

In the foregoing preparation, the yield of the cyanoethyl ester may be improved comparable to that obtained in preparing bis(1-cyanoethyl) adipate in the previous example by the addition of a concentrated salt solution (e.g., sodium sulfate) during the washing step to inhibit the formation of a stable emulsion.

PREPARATION OF BIS(1-CYANOETHYL) PHTHALATE

A flask containing 47 parts of lactonitrile and 53 parts of pyridine is fitted with a stirrer, a condenser, a thermometer, and an addition funnel, and immersed in an ice-water bath. Through the funnel 68 parts of o-phthaloyl chloride is slowly added while the contents of the flask are stirred. Ninety minutes are required for this addition. 130 parts of benzene and 50 parts of water are then added. The flask contents are transferred to a separatory funnel. The aqueous layer is removed and discarded. The organic layer is washed successively with 50 parts of 3% sodium bicarbonate solution and with 100 parts of water, then dried by contact with anhydrous sodium sulfate. The benzene solution is then heated to remove volatile components. Bis(1-cyanoethyl) o-phthalate is recovered as a residual oil which does not distill below 150° C. at 1 mm. pressure. The yield is 60 parts.

In a like manner, the preparation of various other esters, either the 1-cyanoethyl or 2-cyanoethyl derivative, may be prepared through the condensation reaction of 1-cyanoethanol or 2-cyanoethanol and the various dicarboxylic acids of the group specified in the above formula, the anhydrides thereof or the acyl halides thereof. Suitable compounds useful as plasticizers with polymers containing predominant amounts of combined acrylonitrile according to the invention thus include tris(1-cyanoethyl) phosphate, bis(1-cyanoethyl) carbonate, bis(1-cyanoethyl) oxalate, bis(1-cyanoethyl) malonate, bis(1-cyanoethyl) succinate, bis(1-cyanoethyl) glutarate, bis(1-cyanoethyl) adipate, bis(1-cyanoethyl) pimelate, bis(1-cyanoethyl) suberate, bis(1-cyanoethyl) azelate, bis(1-cyanoethyl) sebacate, bis(1-cyanoethyl) phthalate, bis(1-cyanoethyl) isophthalate, bis(1-cyanoethyl) terephthalate and the 2-isomers of these compounds, i.e., bis(2-cyanoethyl) oxalate, bis(2-cyanoethyl) malonate, and the like.

Homopolymeric acrylonitrile and acrylonitrile copolymers containing in the polymer molecules an average of at least 60% by weight of combined acrylonitrile are employed in carrying the present invention into effect. In a preferred aspect, the present invention contemplates copolymers of acrylonitrile containing from 60 to 90% acrylonitrile and 40 to 10% of a different copolymerizable monomer having a single $CH_2=C<$ group. These polymers and copolymers are prepared by methods well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 60% by weight of combined acrylonitrile. The expression "polymerization product containing in the polymer molecules an average of at least 60% by weight of combined acrylonitrile," as used herein, means a polymerization product (polymer, copolymer or interpolymer or mixtures thereof) containing in its molecules an average of at least 60% by weight of the acrylonitrile unit,

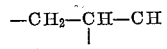

or, otherwise stated, at least 60% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 60% by weight of combined acrylonitrile are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc.; vinyl and vinylidene halides, e.g., the vinyl and vinylidene chlorides, bromides and fluorides; allyl, methallyl and other unsaturated monohydric alcohol esters of monobasic acids, e.g., allyl and methallyl acetates, laurates, cyanides, ets.; acrylic and alkacrylic acids, e.g., methacrylic, ethacrylic, etc., and esters and amides of such acids, e.g., methyl, ethyl, propyl, butyl, etc., acrylates and methacrylates, acrylamide, methacrylamide, N-methyl, -ethyl, -propyl, -butyl, etc., acrylamides and methacrylamides, etc.; methacrylonitrile, ethacrylonitrile and other hydrocarbon-substituted acrylonitriles; vinyl aromatic monomers, e.g., styrene, the methylstyrenes, e.g., o-, m-, and p-methylstyrene, dimethylstyrene, as well as halogenated styrenes, such as chloro- and bromo-styrenes, ring-substituted chloro- and bromo-methylstyrenes, and the like; unsaturated aliphatic hydrocarbons containing a single $CH_2=C<$ grouping, e.g., isobutylene, etc.; and numerous other vinyl, acrylic and other compounds containing a single $CH_2=<C$ grouping which are copolymerizable with acrylonitrile to yield thermoplastic copolymers.

The proportions of monomers in the polymerizable mixture may be varied as desired or as may be required in order to obtain a polymerization product containing in the polymer molecules an average of at least 60% by weight of combined acrylonitrile. Thus, when the polymerization rate of the monomers present in the polymerizable mixture is substantially the same, the proportions may vary from about 60% to about 100% of acrylonitrile and up to about 40% by weight of the other comonomer. When the polymerizable mixture contains, in addition to the acrylonitrile, a monomer such as, for example, vinyl chloride, vinyl acetate, isobutylene, etc., which polymerizes at a rate different from that of acrylonitrile, then it may be necessary to subject to polymerization conditions a mixture in which the acrylonitrile constitutes as little as, for instance, 50% by weight thereof in order to obtain a polymerization product containing in the copolymer molecules an average of at least 60% by weight of acrylonitrile. For example, in the copolymerization of acrylonitrile and isobutylene a monomer charge in the ratio of acrylonitrile to isobutylene of about 50:50 is required to obtain a copolymer having a combined ratio of 70:30, respectively.

Any suitable method of polymerizing the monomeric acrylonitrile or mixture of monomers may be employed. One suitable method comprises polymerizing the monomer or mixture of monomers in an aqueous emulsion using a suitable polymerization catalyst, e.g., ammonium persulfate. Other polymerization methods, however, also may be used, e.g., methods such as those described in U.S. Patent Nos. 2,160,054 and 2,436,926, for example. The polymeric and copolymeric acrylonitriles used in practicing my invention may be of any suitable molecular weight, but ordinarily the molecular weight (average molecular weight) is within the range of 40,000 to 1,000,000 or higher, and advantageously is of the order of 50,000 to 750,000, as calculated from a viscosity measurement of the polymer in dimethyl formamide using the well known Staudinger equation which is referred to in U.S. Patent No. 2,404,713.

Incorporation of the plasticizers in the acrylonitrile polymer may be conducted by any suitable procedure, such as by blending on a two roll mill or by use of a Banbury mixer, for example. The blending time may be shortened by using a comminuted polymer. To minimize the possibility of discoloration, it is generally advisable to employ blending temperatures as low as is consistent with practical considerations, although temperatures up to 110° C. and even higher may be employed with certain polymers and mixing cycles. The proportions of the acrylonitrile polymerization product and the cyanoethyl ester in the composition of my invention may be varied widely, depending mainly on the properties desired and on the particular use for which the composition is intended. In the preparation of a film, for example, in which a suitable solvent, such as dimethyl formamide, is employed, amounts of as little as 5%, based on the weight of the polymer, may be sufficient. On the other hand, amounts of 100% and even greater quantities of the plasticizer based on the weight of the polymer may be employed.

The plasticized compositions of the invention may not only be molded into useful articles of manufacture by procedures known to those with ordinary skill in the art, but as noted hereinabove the plasticized acrylonitrile product may be cast in the form of films. For example, a dimethylformamide solution of the acrylonitrile polymer may be cast upon a revolving drum which is partly immersed in a coagulating bath of, for example, water, cold benzene, etc., which will extract the dimethylformamide and serve to deposit the acrylonitrile polymerization product as a thin film on the drum as it passes through the bath. The resulting film may be stretched, if desired, lengthwise and crosswise by suitable apparatus to improve its properties. Alternatively, solutions of the acrylonitrile polymer with cyanoethyl esters may be evaporated in a gaseous atmosphere to form films which may be similarly stretched to improve their properties.

Compositions comprising the cyanoethyl esters hereinbefore described with polymer comprising at least 60% combined acrylonitrile may also be employed as a dielectric or in the manufacture of components for electrical applications. The plasticized composition can also be combined with paper, fabrics and other dielectrics.

In order that those skilled in the art may better understand how the invention may be practiced, the following examples are given by way of illustration and are not to be construed as a limitation of the invention. In the examples, all parts are parts by weight unless noted otherwise.

*Example 1*

100 parts of a copolymer comprising 77 parts acrylonitrile and 23 parts isobutylene is milled on heated rolls with 50 parts of tris(1-cyanoethyl) phosphate. The resulting product is molded into a bar of ½ inch square cross-section. This bar was tough and flexible; when subjected to a notched impact test it failed to break, even under severe testing conditions, i.e., greater than 2 ft.-lb./in. A similar bar made from the copolymer above without plasticizer was firm and stiff, and had a notched impact strength of only 0.26 ft.-lb./in.

*Example 2*

100 parts of the copolymer of Example 1 and 50 parts of tris(1-cyanoethyl) phosphate were dissolved in 1000 parts of dimethylformamide. A film was cast from this solution. On evaporation of the dimethylformamide, the resulting dry film was extremely soft and flexible. A similar film without the phosphate is stiff and easily fragments when flexed.

*Example 3*

100 parts of polyacrylonitrile were substituted for the copolymer of Example 1 and cast as a film of 0.003 inch dry thickness according to the procedure of Example 2. The film obtained without the phosphate plasticized is smooth and clear but extremely brittle, fracturing when bent through a 180° angle. The plasticized film is equally smooth and clear but much more pliable, remaining intact when bent at least twenty times through a 180° angle.

*Example 4*

A copolymer containing 73% combined acrylonitrile and 27% combined isobutylene, prepared according to conventional procedures using an emulsion polymerization in the presence of ammonium persulfate and sodium bisulfite, was combined with one-half its weight of bis-(1-cyanoethyl) adipate. This mixture was worked on a roll mill heated to 175° C. for 12 minutes, yielding a soft sheet which is stripped easily from the rolls. This sheet is pressed between heated platens held 0.078 inch apart by metal shims, giving a smooth, flexible sheet free of cracks, and having a tensile strength of 2100 lb./in.$^2$ and an ultimate elongation of 370% when tested according to ASTM D-638. A similar experiment, the acrylonitrile-isobutylene (73/27) copolymer in which the cyanoethyl adipate was omitted, yielded a rigid material which, after pressing between the heated platens, contained numerous cracks. The material with plasticizer omitted is much too stiff to test for ultimate elongation by the above-mentioned test.

*Example 5*

A solution is prepared containing 2 parts of an 80/20 copolymer of acrylonitrile/butyl acrylate and 1 part of bis(1-cyanoethyl) phthalate in 20 parts of dimethylformamide. A similar solution is prepared omitting the cyanoethyl phthalate. Another pair of solutions is prepared containing, in the first instance, 2 parts of a 75/25 copolymer of acrylonitrile/isobutylene and 1 part of bis-(1-cyanoethyl) phthalate, and in the second instance only 2 parts of the said copolymer, each with 10 parts of dimethylformamide. Films are cast on glass plates from each of the four solutions and the dimethylformamide permitted to evaporate. The films are then stripped from the glass and tested for extensibility using specimens one-half inch wide. The plasticized films were far more extensible, as shown in the following table.

| Polymer | Extensibility Before Rupture | |
|---|---|---|
| | Unplasticized | Plasticized |
| | *Percent* | *Percent* |
| 80/20 Acrylonitrile/Butyl Acrylate | 9 | 210 |
| 75/25 Acrylonitrile/Isobutylene | 5 | 367 |

From the foregoing description it will be seen that the present invention provides compositions comprising an acrylonitrile polymerization product and a plasticizer. These compositions can be shaped or fabricated, as by extrusion, molding, casting, etc., into a wide variety of useful articles. Lubricants, antistatic agents and other conventional modifiers of acrylonitrile polymerization products can be incorporated therein at any suitable stage of the operation.

I claim:
1. A synthetic resinous composition comprising a major portion of a polymerization product selected from the group consisting of homopolymers of acrylonitrile and copolymers containing at least 60% by weight of combined acrylonitrile, the remainder being a compound copolymerizable with acrylonitrile and containing a

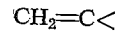

group and a fully esterified cyanoethyl ester as a plasticizer therefor, said ester plasticizer being derived from the condensation of a compound selected from the group consisting of 1-cyanoethanol and 2-cyanoethanol and an acid selected from the group consisting of phosphoric acid, carbonic acid, and dicarboxylic acids having the formula:

HOOC—R—COOH wherein R is a $C_nH_{2n}$ radical wherein $n$ is an integer of from 0 to 8.

2. A synthetic resinous composition comprising a major portion of a polymerization product containing from about 60 to 90% by weight of combined acrylonitrile and from about 40 to 10% by weight of a compound copolymerizable with acrylonitrile and containing a $CH_2\!=\!C\!<$ group and a fully esterified cyanoethyl ester plasticizer therefor, said ester being derived from the condensation of a compound copolymerizable with acrylonitrile and selected from the group consisting of: 1-cyanoethanol and 2-cyanoethanol and an acid selected from the group consisting of phosphoric acid, carbonic acid, and dicarboxylic acids having the formula:

HOOC—R—COOH wherein R is a $C_nH_{2n}$ radical wherein $n$ is an integer of from 0 to 8.

3. A synthetic resinous composition comprising a major portion of a polymerization product containing from about 60 to 90% by weight of combined acrylonitrile and from about 40 to 10% by weight of a compound copolymerizable with acrylonitrile and containing a $CH_2\!=\!C\!<$ and as a plasticizer therefor a fully esterified tris(1-cyanoethyl) phosphate.

4. A synthetic resinous composition comprising a major portion of a polymerization product containing from about 60 to 90% by weight of combined acrylonitrile and from about 40 to 10% by weight of isobutylene and a major portion of a fully esterified cyanoethyl ester, said ester being derived from the condensation of a compound selected from the group consisting of 1-cyanoethanol and 2-cyanoethanol and an acid selected from the group consisting of phosphoric acid, carbonic acid, and dicarboxylic acids having the formula:

HOOC—R—COOH wherein R is a $C_nH_{2n}$ radical wherein $n$ is an integer of from 0 to 8.

5. A synthetic resinous composition comprising a polymerization product containing from about 60 to 90% by weight of combined acrylonitrile and from about 40 to 10% by weight of isobutylene and as a plasticizer therefor a fully esterified tris(1-cyanoethyl) phosphate.

6. A synthetic resinous composition comprising a major portion of a polymerization product containing from about 60 to 90% by weight of combined acrylonitrile and from about 40 to 10% by weight of a compound copolymerizable with acrylonitrile and containing a $CH_2\!=\!C\!<$ group and as a plasticizer a fully esterified bis(2-cyanoethyl) succinate.

7. A synthetic resinous composition comprising a major portion of a polymerization product containing from about 60% to 90% by weight of combined acrylonitrile and from about 40 to 10% by weight of a compound copolymerizable with acrylonitrile containing a $CH_2\!=\!C\!<$ group and fully as a plasticizer a esterified bis-(1-cyanoethyl) adipate.

8. A synthetic resinous composition comprising a major portion of a polymerization product containing from about 60 to 90% by weight of combined acrylonitrile and from about 40 to 10% by weight of butyl acrylate and a fully esterified cyanoethyl ester plasticizer therefor, said ester being derived from the condensation of a compound selected from the group consisting of 1-cyanoethanol and 2-cyanoethanol and an acid selected from the group consisting of phosphoric acid, carbonic acid, and dicarboxylic acids having the formula:

HOOC—R—COOH wherein R is a $C_nH_{2n}$ radical wherein $n$ is an integer of from 0 to 8.

References Cited by the Examiner

UNITED STATES PATENTS

| | | | |
|---|---|---|---|
| 2,456,517 | 12/1948 | Ladd et al. | 260—31.8 |
| 2,552,814 | 5/1951 | Ralston et al. | 260—31.2 |
| 2,790,820 | 4/1957 | Lynn | 260—31.8 |
| 2,881,147 | 4/1959 | Graham | 260—30.6 |
| 2,951,865 | 9/1960 | Jaffe | 260—31.8 |
| 2,990,392 | 6/1961 | Saxon et al. | 260—31.2 |

MORRIS LIEBMAN, *Primary Examiner.*

UNITED STATES PATENT OFFICE
CERTIFICATE OF CORRECTION

Patent No. 3,219,616 November 23, 1965

Robert Saxon

It is hereby certified that error appears in the above numbered patent requiring correction and that the said Letters Patent should read as corrected below.

Column 1, line 41, for "plastizer" read -- plasticizer --; line 43, for "bittleness" read -- brittleness --; column 4, line 4, for "-$CH_2$-$CH$-CH" read -- -$CH_2$-$CH$-CN --; line 36, for "$CH_2$=<C" read -- $CH_2$=C< --; column 7, line 30, for "$CH_2$=C<" read -- $CH_2$=C< group --.

Signed and sealed this 18th day of October 1966.

(SEAL)
Attest:

ERNEST W. SWIDER
Attesting Officer

EDWARD J. BRENNER
Commissioner of Patents